United States Patent Office 2,741,612
Patented Apr. 10, 1956

2,741,612
N-SUBSTITUTED DIHYDRONORMORPHINE COMPOUNDS

Robert L. Clark, Woodbridge, N. J., assignor to Merck & Co., Inc., Rahway, N. J., a corporation of New Jersey No Drawing. Application November 22, 1952,
Serial No. 322,143

9 Claims. (Cl. 260—285)

This invention is concerned generally with novel derivatives of morphine and with processes for preparing these morphine derivatives. More particularly, it relates to novel N-substituted dihydronormorphine compounds having attached to the nitrogen atom the terminal carbon of a straight aliphatic chain consisting of three carbon atoms, to lower alkanoyl esters of these N-substituted dihydronormorphine compounds, to acid salts thereof, and to novel processes for preparing these compounds starting with dihydronormorphine or with the corresponding N-substituted normorphine compound. These N-substituted dihydronormorphine compounds, their esters, and salts thereof, are active as morphine antagonists.

The N-substituted dihydronormorphine compounds, their esters, and acid salts thereof, subject of the present invention, may be chemically represented by the following structural formulae:

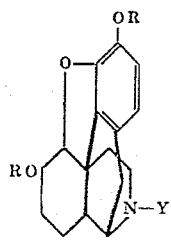
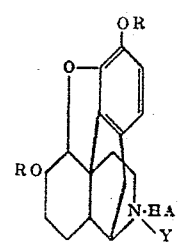

wherein R is hydrogen or a lower alkanoyl radical, Y is an aliphatic radical containing a straight chain consisting of three carbon atoms a terminal carbon of which is attached to the nitrogen atom, and HA is an acid.

The chemical relationship of these N-dihydronormorphine compounds, and their esters, to morphine is clear from a comparison of the foregoing formulae with the formula for morphine which is as follows:

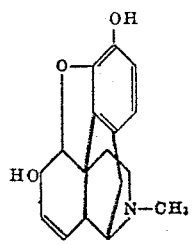

Whereas the alkaloid morphine is a potent analgesic, I have found that N-substituted dihydronormorphine compounds having attached to the nitrogen atom the terminal carbon of a straight aliphatic chain consisting of three carbon atoms, in particular N-n-propyldihydronormorphine, N-isobutyldihydronormorphine, N-allyldihydronormorphine, N-methallyldihydronormorphine, the lower alkanoyl esters of these N-substituted dihydronormorphine compounds, and acid salts thereof, are strong morphine antagonists and prevent or abolish the analgesic action of morphine when utilized in conjunction with that drug.

This antagonistic action possessed by the subject compounds is particularly surprising in view of the fact that other N-alkyldihydronormorphine compounds such as N-methyldihydronormorphine (i. e. dihydromorphine), N-n-butyldihydronormorphine, N-amyldihydronormorphine, N-hexyldihydronormorphine as well as the 3-methyl ether derivatives of the subject compounds exhibit no appreciable morphine antagonistic activity.

The N-substituted dihydronormorphine compounds having attached to the nitrogen atom the terminal carbon of a straight aliphatic chain consisting of three carbon atoms, the lower alkanoyl esters of these N-substituted dihydronormorphine compounds, and acid salts thereof, can be prepared by reactions which may be chemically represented as follows:

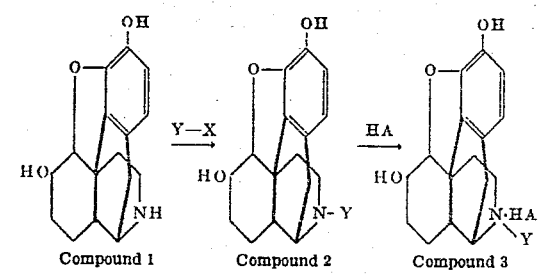

wherein R is a lower alkanoyl radical, Y is an aliphatic radical containing a straight chain consisting of three carbon atoms a terminal carbon of which is attached to the nitrogen atom, X is a halo radical and HA is an acid.

The reactions indicated hereinabove are carried out as follows: Dihydronormorphine (Compound 1) is reacted with an aliphatic halide of the formula Y—X wherein X and Y have the significance defined hereinabove, thereby forming the corresponding N-substituted dihydronormorphine compound (Compound 2); the latter compound is reacted with an acid to produce the corresponding salt of said N-substituted dihydronormorphine compound (Compound 3); alternatively, the N-substituted dihydronormorphine compound is reacted with a lower alkanoic anhydride thereby producing the corresponding 3,6-dialkanoyl N-substituted dihydronormorphine compound wherein the N-substituent is an aliphatic radical containing a straight chain consisting of three carbon atoms a terminal carbon of which is attached to the nitrogen atom (Compound 4), which is converted by reaction with an acid to the corresponding acid salt of the 3,6-dialkanoyl N-substituted dihydronormorphine compound (Compound 5).

The aliphatic halides which react with dihydronormorphine to form my novel N-substituted dihydronormorphine compounds contain a straight aliphatic chain consisting of three carbon atoms the terminal carbon of which is attached to the halogen atom; in one preferred embodiment of my invention, a methyl grouping is connected to the middle carbon atom of this straight aliphatic chain. I prefer to employ as the aliphatic halide an n-propyl halide such as n-propyl chloride, n-propyl bromide, n-propyl iodide, an isobutyl halide such as isobutyl chloride, isobutyl bromide, isobutyl iodide, an allyl halide such as allyl chloride, allyl bromide, allyl iodide, a methallyl halide such as methallyl chloride, methallyl bromide, methallyl iodide, and the like. The reaction between the aliphatic halide and dihydronormorphine is ordinarily conducted by heating the reactants together in contact with an acid-binding agent in a liquid medium which is substantially inert under the reaction conditions and which is a solvent for the reactants. I prefer to utilize, as the liquid medium, a lower aliphatic alcohol such as methanol, ethanol, propanol and the like. The liquid medium employed should be substantially free of water. As the acid-binding agent I ordinarily utilize an alkali metal carbonate, such as sodium carbonate, potassium carbonate, an alkali metal bicarbonate such as sodium bicarbonate, potassium bicarbonate, an alkaline earth metal carbonate, such as calcium carbonate, barium carbonate, and the like. I prefer to conduct the reaction by bringing together, in an organic solvent, approximately equimolar quantities of dihydronormorphine and the aliphatic halide, and heating the solution under reflux in contact with an excess of the acid-binding agent for an extended period of time. I have found that, under these reaction conditions, a heating period of about eight hours or more is ordinarily required to complete the reaction between the dihydronormorphine and the aliphatic halide.

In accordance with the foregoing procedure, there is obtained the corresponding N-substituted dihydronormorphine compound having attached to the nitrogen atom the terminal carbon of a straight aliphatic chain consisting of three carbon atoms which may have a methyl grouping attached to the middle carbon atom of said chain, as, for example, N-n-propyldihydronormorphine, N - isobutyldihydronormorphine, N - allyldihydronormorphine, and N - methallyldihydronormorphine. The N-substituted dihydronormorphine compound is conveniently recovered by evaporating the organic solvent from the reaction mixture, preferably under reduced pressure, and extracting the residual material with a hot chlorinated solvent such as chloroform. The chlorinated solvent extract is filtered thereby removing any unreacted dihydronormorphine since the latter compound is insoluble in chlorinated solvents. The filtered solution is evaporated to dryness to give the N-substituted dihydronormorphine compound in crude form; this crude material can be rendered crystalline by trituration with ether or petroleum ether and the resulting material purified by recrystallization from lower aliphatic alcohols such as methanol and ethanol.

Alternatively, the N-substituted dihydronormorphine compounds having attached to the nitrogen atom a terminal carbon of a straight aliphatic chain consisting of three carbon atoms may be prepared by hydrogenation of the corresponding N-substituted normorphine compounds. This procedure is ordinarily used, however, only for the preparation of N-alkyldihydronormorphine compounds such as N-n-propyldihydronormorphine and N-isobutyldihydronormorphine since hydrogenation of N-alkenylnormorphine compounds, such as N-allylnormorphine or N-methallylnormorphine, results in the formation of the corresponding N-alkyldihydronormorphine compound.

The N-substituted normorphine compounds utilized as starting materials in this alternate procedure, namely the N-alkylnormorphine compounds, and the N-alkenylnormorphine compounds, can be prepared by reacting normorphine with the appropriate aliphatic halide in the presence of an acid-binding agent utilizing substantially the same procedure as that described hereinabove in connection with the reaction between dihydronormorphine and aliphatic halides. The hydrogenation of the resulting N-substituted normorphine compounds such as N-n-propylnormorphine, N-isobutylnormorphine, N-allylnormorphine, N-methallylnormorphine, and the like, is carried out by dissolving the N-substituted normorphine compound in a lower aliphatic alcohol such as methanol or in a lower alkanoic acid such as acetic acid, or aqueous solutions thereof, and bringing the resulting solution into intimate contact with hydrogen in the presence of a hydrogenation catalyst such as platinum, palladium, or halides thereof. In a preferred embodiment of my procedure, the N-substituted normorphine compound is dissolved in an aqueous solution of acetic acid and the resulting solution is intimately contacted with hydrogen at a pressure somewhat below 100 pounds per square inch, at a temperature of about 30° C., and in the presence of a palladium catalyst. The N - alkyldihydronormorphine compound thus produced can be recovered by filtering the hydrogenation mixture, making the filtered solution alkaline with a base such as ammonium hydroxide, whereby the N-alkyldihydronormorphine crystallizes therefrom and can be recovered by filtration.

The N-substituted dihydronormorphine compound having attached to the nitrogen atom a terminal carbon of a straight aliphatic chain consisting of three carbon atoms is then reacted with a lower alkanoic anhydride such as acetic anhydride, propionic anhydride, and the like, thereby esterifying the hydroxyl radicals in and 3- and 6-positions of the molecule to form the corresponding 3,6-dialkanoyl N-substituted dihydronormorphine compound having attached to the nitrogen atom the terminal carbon of a straight aliphatic chain consisting of three carbon atoms which may have a methyl grouping attached to the middle carbon atom of said chain, as, for example, 3,6 - diacetyl - N - (n - propyl) dihydronormorphine, 3,6-dipropionyl - N - (n-propyl)-dihydronormorphine; 3,6-dibutyryl - N - (n-propyl)-dihydronormorphine; 3,6-diacetyl N - isobutyldihydronormorphine, 3,6 - dipropionyl - N-isobutyldihydronormorphine; 3,6 - dibutyryl-N-isobutyldihydronormorphine, 3,6-diacetyl-N-allyldihydronormorphine; 3,6 - dipropionyl - N - allyldihydronormorphine; 3,6-dibutyryl - N-allyldihydronormorphine; 3,6-diacetyl-N-methallyldihydronormorphine; 3,6-dipropionyl-N-methallyldihydronormorphine; 3,6 - dibutyryl - N-methallyldihydronormorphine, and the like.

The reaction between the alkanoic acid anhydride and the N-substituted dihydronormorphine compound is ordinarily conducted by heating a mixture of the reactants to a temperature of about 100° C. for a period of about two to three hours. The reaction mixture is then evaporated under reduced pressure, and the residual material is purified by recrystallization from a lower alkanol such as ethanol to give the 3,6-dialkanoyl-N-substituted dihydronormorphine compound in substantially pure form.

The conversion of the N-substituted dihydronormorphine compounds, or their lower alkanoyl esters, the 3,6-dialkanoyl-N-substituted dihydronormorphine compounds, to the corresponding acid salts is ordinarily conducted by reacting the N-substituted dihydronormorphine compound or the 3,6-dialkanoyl-N-substituted dihydronormorphine compound, under substantially anhydrous conditions, with an acid as for example, hydrogen chloride, hydrogen bromide, sulfuric acid, acetic acid, tartaric acid, citric acid, and the like. This salt-forming reaction is conveniently carried out by dissolving the N-substituted dihydronormorphine compound, or the 3,6-dialkanoyl-N-substituted dihydronormorphine compound, in a hot lower alkanol, such as ethanol, methanol, propanol, and the like, and adding to the solution a slight excess of an alcoholic solution of the appropriate acid. Upon diluting the resulting alcoholic medium with an alcohol-miscible nonsolvent for the product, such as diethyl ether, there crystallizes from the mixture (depending on whether the N-substituted dihydronormorphine, or its ester, is used as starting material) the acid salt of the N-substituted dihydronormorphine compound, or, the acid salt of the 3,6-dialkanoyl-N-substituted dihydronormorphine; such 3,6-dialkanoyl-N-substituted dihydronormorphine hydrochloride; N-n-propyldihydronormorphine hydrobromide, N-n-propyldihydronormorphine sulfate, N - isobutyldihydronormorphine hydrochloride, N-isobutyldihydronormorphine hydrobromide, N-isobutyldihydronormorphine sulfate, N-n-propyldihydronormorphine acetate, N-n-propyldihydronormorphine tartrate, N-isobutyldihydronormorphine acetate, N-isobutyldihydronormorphine tartrate, N-allyldihydronormorphine hydrochloride, N-allyldihydronormorphine hydrobromide, N-allyldihydronormorphine sulfate, N-allyldihydronormorphine tartrate, N-allyldihydronormorphine acetate, N-methallyldihydronormorphine hydrochloride, N-methallyldihydronormorphine hydrobromide, N-methallyldihydronormorphine sulfate, N-methallyldihydronormorphine tartrate, N-methallyldihydronormorphine acetate, 3,6-diacetyl-N-(n-propyl)-dihydronormorphine hydrochloride, 3,6-diacetyl-N-(n-propyl)-dihydronormorphine hydrobromide, 3,6-diacetyl-N-(n-propyl)-dihydronormorphine sulfate, 3,6-diacetyl-N-(n-propyl)-dihydronormorphine acetate, 3,6-diacetyl-N-(n-propyl)-dihydronormorphine tartrate, 3,6-dipropionyl-N-(n-propyl)-dihydronormorphine hydrochloride, 3,6-dipropionyl-N-(n-propyl)-dihydronormorphine hydrobromide, 3,6-dipropionyl-N-(n-propyl)-dihydronormorphine sulfate, 3,6-dipropionyl-N-(n-propyl)-dihydronormorphine acetate, 3,6-dibutyryl-N-(n-propyl)-dihydronormorphine hydrochloride, 3,6-dibutyryl-N-(n-propyl)-dihydronormorphine hydrobromide, 3,6-dibutyryl-N-(n-propyl)-dihydronormorphine sulfate, 3,6-dibutyryl-N-(n-propyl)-dihydronormorphine tartrate, 3,6-diacetyl-N-isobutyldihydronormorphine hydrochloride, 3,6-diacetyl-N-isobutyldihydronormorphine hydrobromide, 3,6-diacetyl-N-isobutyldihydronormorphine sulfate, 3,6-diacetyl-N-isobutyldihydronormorphine acetate, 3,6-diacetyl-N-isobutyldihydronormorphine tartrate, 3,6-dipropionyl-N-isobutyldihydronormorphine hydrochloride, 3,6-dipropionyl-N-isobutyldihydronormorphine hydrobromide, 3,6-dipropionyl-N-isobutyldihydronormorphine sulfate, 3,6-dipropionyl-N-isobutyldihydronormorphine acetate, 3,6-dibutyryl-N-isobutyldihydronormorphine hydrochloride, 3,6-dibutyryl-N-isobutyldihydronormorphine hydrobromide, 3,6-dibutyryl-N-isobutyldihydronormorphine sulfate, 3,6-dibutyryl-N-isobutyldihydronormorphine tartrate, 3,6-diacetyl-N-allyldihydronormorphine hydrochloride, 3,6-diacetyl-N-allyldihydronormorphine hydrobromide, 3,6-diacetyl-N-allyldihydronormorphine sulfate, 3,6-diacetyl-N-allyldihydronormorphine acetate, 3,6-diacetyl-N-allyldihydronormorphine tartrate, 3,6-dipropionyl-N-allyldihydronormorphine hydrochloride, 3,6-dipropionyl-N-allyldihydronormorphine hydrobromide, 3,6-dipropionyl-N-allyldihydronormorphine sulfate, 3,6-dipropionyl-N-allyldihydronormorphine tartrate, 3,6-dibutyryl-N-allyldihydronormorphine hydrochloride, 3,6-dibutyryl-N-allyldihydronormorphine hydrobromide, 3,6-dibutyryl-N-allyldihydronormorphine sulfate, 3,6-dibutyryl-N-allyldihydronormorphine acetate, 3,6-diacetyl-N-methallyldihydronormorphine hydrochloride, 3,6-diacetyl-N-methallyldihydronormorphine hydrobromide, 3,6-diacetyl-N-methallyldihydronormorphine sulfate, 3,6-diacetyl-N-methallyldihydronormorphine acetate, 3,6-diacetyl-N-methallyldihydronormorphine tartrate, 3,6-dipropionyl-N-methallyldihydronormorphine hydrochloride, 3,6-dipropionyl-N-methallyldihydronormorphine hydrobromide, 3,6-dipropionyl-N-methallyldihydronormorphine sulfate, 3,6-dipropionyl-N-methallyldihydronormorphine acetate, 3,6-dibutyryl-N-methallyldihydronormorphine hydrochloride, 3,6-dibutyryl-N-methallyldihydronormorphine hydrobromide, 3,6-dibutyryl-N-methallyldihydronormorphine sulfate, 3,6-dibutyryl-N-methallyldihydronormorphine tartrate, and the like. The salt thus formed is recovered from the alcoholic slurry by filtration of centrifugation.

The following examples illustrate methods of carrying out the present invention, but it is to be understood that these examples are given for purposes of illustration and not of limitation.

*Example 1*

A mixture of 4 g. of dihydronormorphine, 1.28 ml. of allyl bromide, 1.79 g. of sodium bicarbonate and 50 ml. of absolute ethanol was heated under reflux with stirring for a period of about seventeen hours. At the end of this period the solvent was evaporated in vacuo. The residual material was extracted twice with hot chloroform, the chloroform extracts were filtered to remove the insoluble inorganic material, and the clear chloroform extract was evaporated to dryness. The residual gummy material was dissolved in methanol and the solution was passed through a small column of alumina. The column was washed with methanol until the eluate no longer contained any solids. The methanolic solution of the free base was evaporated to dryness and the residual gummy material was dissolved in ethanolic hydrogen bromide; the solution was acidic. The crystalline material which separated was recovered by filtration and recrystallized from ethanol to give substantially pure N-allyldihydronormorphine hydrobromide, M. P. 263–265° C.; $[\alpha]_D^{25} = -113°$ (C, 0.5 in absolute ethanol). *Analysis.*—Calc'd for $C_{19}H_{23}NO_3 \cdot HBr$: C, 57.88; H, 6.13; N, 3.55. Found: C, 58.08; H, 6.25; N, 3.41.

*Example 2*

An aqueous solution of N-allyldihydronormorphine hydrobromide was made slightly alkaline by the addition of aqueous ammonium hydroxide solution and the resulting solution was extracted with ether. The ethereal extract was washed with water and evaporated to give an amorphous solid which crystallized upon standing. This material was recrystallized from ethyl acetate to give substantially pure N-allyldihydronormorphine, M. P. 179–180° C. $[\alpha]_D^{25} = -170°$ (C, 1 in ethanol).

*Example 3*

Seven hundred milligrams of N-allyldihydronormorphine were dissolved in 10 ml. of acetic anhydride, and the resulting solution was heated at a temperature of about 100° C. for a period of approximately two and one-half hours. The reaction mixture was evaporated nearly to dryness under reduced pressure to give crude 3,6-diacetyl-N-allyldihydronormorphine which is obtained as an amorphous residue. This residual material was dissolved in a warm solution containing 600 mg. of tartaric acid dissolved in absolute ethanol. The resulting solution was cooled, and the crystalline material which separated was recovered and recrystallized from ethanol to give, in substantially pure form, the hemihydrate of the tartaric acid addition salt of N-allyldihydronormorphine diacetate; M. P. 107–113° C.; $[\alpha]_D^{25} = -76°$ (C, 0.78 in absolute ethanol). *Analysis.*—Calc'd for

$$C_{23}H_{27}NO_5 \cdot C_4H_6O_6 \cdot \tfrac{1}{2}H_2O$$

C, 58.37; H, 6.17. Found: C, 58.55; H, 6.35.

*Example 4*

A solution of 15.5 g. of N-allylnormorphine hydrochloride in 150 ml. of a 50% aqueous solution of acetic acid was reacted with hydrogen, at a pressure of about 40 pounds per square inch and at a temperature of about 25–35° C., in the presence of 0.75 g. of palladium chloride. Two moles of hydrogen were absorbed. The catalyst was removed by filtration and ammonium hydroxide was slowly added to the filtered solution. The resulting mixture was allowed to stand at room temperature for a period of about one hour, and the crystalline material which separated was recovered by filtration and recrystallized from ethyl acetate to give substantially pure N-n-propyldihydronormorphine; M. P. 231–232° C., $[\alpha]_D^{25} = -150°$; (C, 0.4 in absolute ethanol). *Analysis.*—Calc'd for

$$C_{19}H_{25}NO_3$$

C, 72.35; H, 7.99; N, 4.44. Found: C, 72.46; H, 7.87; N, 4.24.

The N-allylnormorphine hydrochloride utilized as starting material in the foregoing procedure can be prepared as follows: 35 g. of normorphine and 7.95 g. of allyl bromide is dissolved in 350 cc. of chloroform and the solution is heated in a sealed tube at a temperature of 110° C. for a period of three and one-half hours. The reaction material is filtered, and the residual solid material extracted with chloroform. The chloroform extract is evaporated to dryness in vacuo, and the residual material is triturated with 75 cc. of ether. The resulting mixture is cooled to approximately 0° C. and maintained at that temperature for a period of about two hours. The precipitated material is recovered from the resulting slurry by filtration, and is extracted for fifteen hours with anhydrous ether utilizing a Soxhlet extractor. The ether extract is evaporated in the absence of air to incipient crystallization, cooled to 0° C. and maintained at that temperature for a period of about fifteen hours. The crystalline material which separates is recovered by filtration, washed with ether and dried in vacuo to give substantially pure N-allylnormorphine; M. P. 208–209° C. This N-allylnormorphine is dissolved in ethanol, and a slight excess of alcoholic hydrochloric acid is added to the solution whereupon a crystalline material separates rapidly from the resulting mixture. This crystalline material is recovered by filtration, washed with cold alcohol and dried in vacuo to give substantially pure N-allylnormorphine hydrochloride.

*Example 5*

N-n-propyldihydronormorphine, prepared as described in Example 4 hereinabove, was dissolved in ethanolic hydrogen chloride, whereupon an oily product precipitated. Upon stirring the resulting mixture, the oily material crystallized, and this crystalline material was recovered by filtration and recrystallized from absolute ethanol to give substantially pure N-n-propyldihydronormorphine hydrochloride; M. P. 147–149° C.; $[\alpha]_D^{25} = -113.5°$ (C, 1.5 in absolute ethanol); analysis of a sample dried at 78° C. and 1 mm. pressure: Calc'd for N-n-propyldihydronormorphine hydrochloride monohydrate,

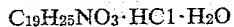

C, 61.69; H, 7.63; found: C, 61.93; H, 7.47.

*Example 6*

A solution containing 325 mg. of N-methallylnormorphine in 20 ml. of a 50% aqueous solution of acetic acid was reacted with hydrogen, at a pressure of about 40 pounds per square inch and at a temperature of approximately 25° C., using 0.1 g. of palladium chloride as a catalyst. The catalyst was removed by filtration, a layer of ether was placed on top of the filtered solution, and the resulting mixture was made basic with ammonium hydroxide. The white solid material which precipitated was removed by filtration and recrystallized from absolute ethanol to give substantially pure N-isobutyldihydronormorphine; M. P. 194–195° C.; $[\alpha]_D^{25} = -156°$ (C, 0.99 in ethanol). *Analysis.*—Calc'd for $C_{20}H_{27}NO_3$: C, 72.93; H, 8.26. Found: C, 73.15; H, 7.78.

The N-methallylnormorphine, utilized as starting material in the foregoing procedure, can be prepared as follows: A mixture of 6.0 g. of normorphine, 2.68 g. of sodium bicarbonate, 2.3 ml. of methallyl chloride, and 100 ml. of absolute ethanol is heated under reflux with stirring for a period of seventy-four hours. At the end of this period, the reaction mixture is filtered thereby removing insoluble material. The filtered solution is evaporated to dryness under reduced pressure and the residual material is extracted twice with hot chloroform. The chloroform extract is evaporated to dryness, and the residual material is triturated with ether. The tan solid material which precipitates from the ethereal mixture is dissolved in a 1:1 mixture of acetone: methanol, activated charcoal is added to the solution, and the resulting mixture is filtered. The filtered solution is evaporated to small volume, and the white needles which crystallize from the ethereal solution are recovered by filtration and dried to give substantially pure N-methallylnormorphine; M. P. 216° C.

*Example 7*

N-isobutyldihydronormorphine, prepared as described in Example 6 hereinabove, was dissolved in ethanolic hydrogen chloride, whereupon an oily product precipitated. Upon stirring the resulting mixture, the oily material crystallized, and this crystalline material was recovered by filtration and recrystallized from absolute ether to give substantially pure N-isobutyldihydronormorphine hydrochloride.

Various changes and modifications may be made in carrying out the present invention without departing from the spirit and scope thereof. Insofar as these changes and modifications are within the purview of the annexed claims, they are to be considered as part of my invention.

I claim:

1. A compound selected from the group which consists of N-substituted dihydronormorphine compounds having attached to the nitrogen atom a radical selected from the group consisting of N-n-propyl, N-isobutyl, N-allyl and N-methallyl radicals, lower alkanoyl esters of said N-substituted dihydronormorphine compounds, and acid addition salts thereof.

2. N-n-propyldihydronormorphine.

3. N-n-propyldihydronormorphine hydrochloride.

4. N-allyldihydronormorphine.

5. N-allyldihydronormorphine sulfate.

6. 3,6-diacetyl-N-allyldihydronormorphine acetate.

7. The process which comprises reacting an N-substituted normorphine compound, having attached to the nitrogen atom a radical selected from the group consisting of N-n-propyl, N-isobutyl, N-allyl and N-methallyl radicals, with hydrogen under pressure in the presence of a noble metal hydrogenation catalyst thereby forming the corresponding N-substituted dihydronormorphine compound.

8. The process which comprises reacting together, in a medium comprising aqueous acetic acid and in the presence of palladium chloride catalyst, N-allylnormorphine and hydrogen, thereby forming N-n-propyldihydronormorphine.

9. The process which comprises reacting together, in a medium comprising aqueous acetic acid and in the presence of palladium chloride catalyst, N-methallylnormorphine and hydrogen, thereby forming N-isobutyldihydronormorphine.

References Cited in the file of this patent

UNITED STATES PATENTS

| 2,364,833 | Weijlard | Dec. 12, 1944 |

FOREIGN PATENTS

| 289,274 | Germany | Dec. 14, 1915 |
| 488,610 | Germany | Jan. 7, 1930 |

OTHER REFERENCES

McCawley et al.: JACS, vol. 63, p. 314 (1941).
Braun: Ber. 49, 977–89 (1916).